3 Sheets--Sheet 1.
J. SILVERSMITH.
Manufacture of Printing Types.
No. 144,571. Patented Nov. 11, 1873.
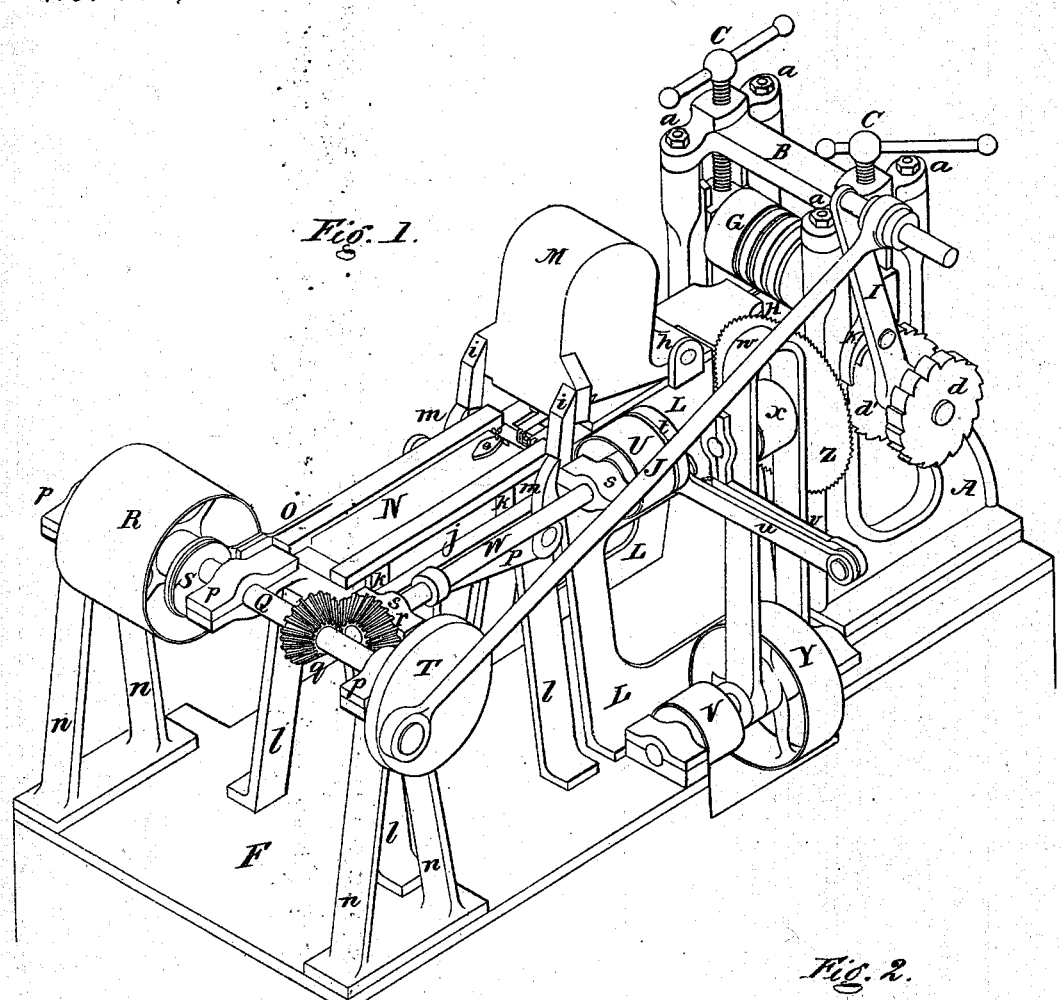
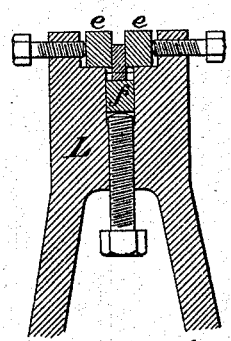
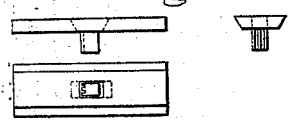
Witnesses
Wm Howard
H. L. Perrine
Inventor
Julius Silversmith

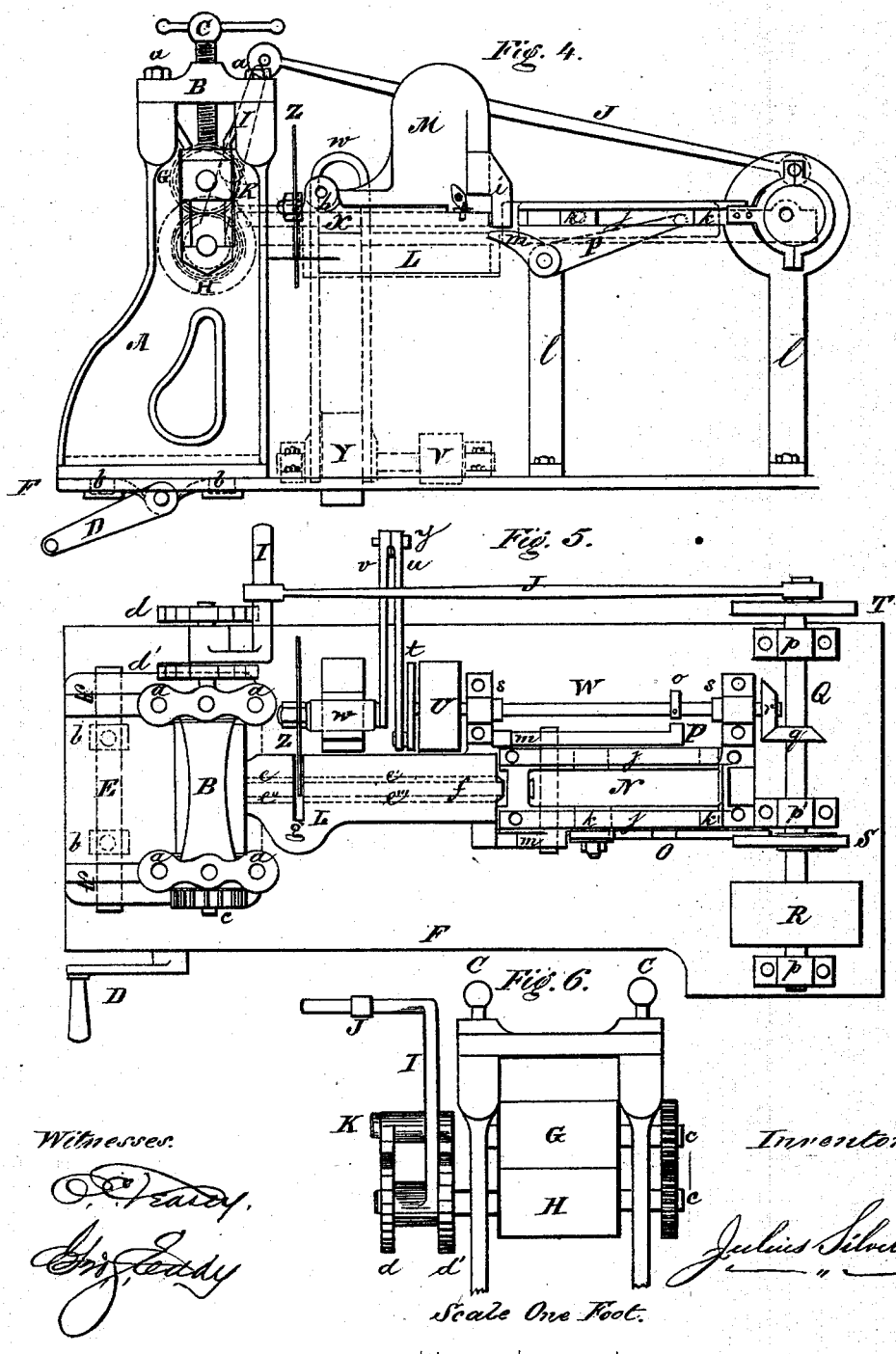

3 Sheets--Sheet 3.
J. SILVERSMITH.
Manufacture of Printing Types.
No. 144,571. Patented Nov. 11, 1873.
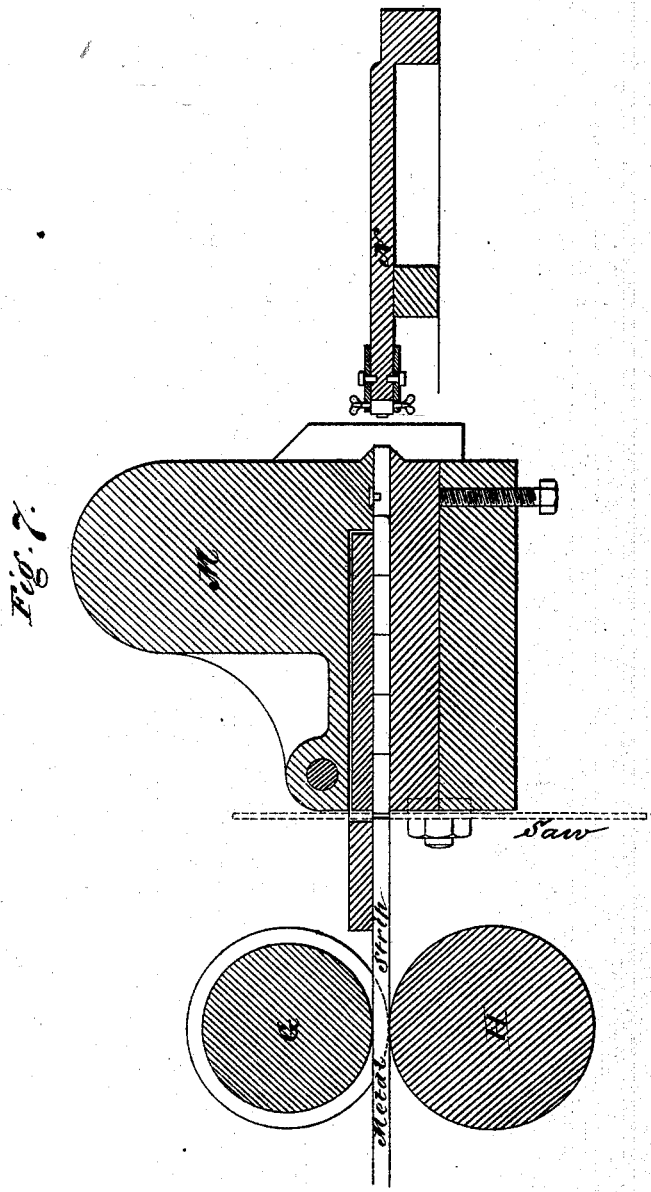

UNITED STATES PATENT OFFICE.

JULIUS SILVERSMITH, OF CHICAGO, ILLINOIS.

IMPROVEMENT IN THE MANUFACTURE OF PRINTING-TYPES.

Specification forming part of Letters Patent No. 144,571, dated November 11, 1873; application filed March 11, 1872.

*To all whom it may concern:*

Be it known that I, JULIUS SILVERSMITH, of Chicago, in the county of Cook and State of Illinois, have invented a new and useful Improved Machine for the Manufacture of Printing Letters or Types, of which the following is a specification:

This invention has for its object to furnish a machine by which, in several consecutive operations, it will be possible to form types and other characters, signs, &c., used in the art of printing, from a strip or blank of ductile metal. The invention chiefly consists in combining the following elements for accomplishing the desired result, viz.: A rolling-mill, through which the blank or strip of metal is passed for compressing and properly shaping the same; an intermittently-acting circular saw for cutting or severing the strip to form the types; a reciprocating matrix or die for forming the letter or ornament upon the end of the type; and a trip-hammer or punch for "nicking" the sides of the type. The invention also consists in the provision of a circular saw for severing or cutting the strip of metal into types of various sizes, said saw being mounted in an oscillating frame, which is intermittently thrown outward for removing the saw from contact with the blank or strip, and caused to approach the latter, after a sufficient quantity of metal has passed to form a type, for the purpose of severing the same.

In the drawings, Figure 1 represents a perspective view of my invention. Fig. 2 is a sectional end view of the variable or adjustable feed channel or groove. Fig. 3 represents in detail the punch or punches applied to the trip-hammer for nicking the type. Fig. 4 illustrates a side view. Fig. 5 exhibits a top view of the machine. Fig. 6 represents a front view of the feed rolling-mill, and Fig. 7 illustrates the relative arrangement and operation of the devices for forming the type from the blank.

The vertical frame A, carrying the mechanism for preparing or shaping the blank from which types are to be manufactured, is arranged on the bed plate or platform F, and the base of said frame is formed with lateral projections b, (shown by dotted lines in Figs. 4 and 5,) which fit into transverse slots formed in the bed-plate F, to enable the entire frame to be moved laterally by means of a screw and crank, D. The lateral standards of the frame A are slotted for the reception of the journal-boxes of the superposed rollers G H, and in order that the distance between the rollers may be varied according to the thickness of the type-blank to be passed through the same, I provide adjusting-screws C extending through the upper transverse bar B, which is secured to the frame A by bolts a. The upper roller G is formed with a series of annular or circumferential grooves of various widths, in order that blanks for forming letter-types, spaces, and quadrats may be rolled upon the same rollers. Provision is also made for enabling the upper roller to be readily removed by simply removing the bolts and bars B for the purpose of inserting different rollers for each font of type. The rollers G H are connected by spur-gearing c c, so that the same may be revolved by the same mechanism, which consists of an oscillating arm, I, journaled upon the spindle of the lower roller H, and carrying a pivoted pawl, K, which is caused to successively engage with the teeth of a ratchet-disk, d', causing a progressive movement of the same for revolving the rollers. The blank, which may be of copper or other suitable metal is in its passage between the rollers compressed or rolled to the proper size, which shall insure exactitude and uniformity of size required in the finished type.

When the feed of the blank to the cutting and stamping devices is too comparatively rapid for forming letter-type, I employ the ratchet d' with an increased number of teeth; but when manufacturing quadrats, spaces, &c., it is necessary to obtain a slow feed, which is effected by causing the operative pawl to engage with a ratchet-disk, d, with a less number of teeth and farther apart than in d'.

The oscillating lever and pawl are operated from the main power-shaft Q through the medium of a rod, J, which is connected, respectively, with an eccentric, T, on said shaft, and with the pawl-lever 1. Said power-shaft is journaled in boxes p p in the frame u, and is provided with a pulley, R, for the application of the driving-belt. The eccentric T serves to impart an intermittent forward movement to the pawl-lever, which will cause the pawl, after having turned the ratchet-disk one tooth, to remain inoperative, thus arresting the feed of the blank, and holding the same stationary until the cutting-saw has severed the blank to form a proper-sized type. The cutting mechanism consists of a circular saw, Z, mounted on a mandrel, which is journaled in the upper end of an oscillating frame, $w$. The saw-mandrel carries a pulley, X, for the reception of a belt, which passes around a pulley, Y, on a shaft arranged at the base of the machine, said shaft forming, also, the axis upon which the frame $w$ oscillates. A longitudinal shaft, W, journaled in bearings $s\ s$ in the top of the frame, receives a continuous rotary motion from the main or power shaft Q through the medium of the gear-wheels $q\ r$, and transmits the same to the saw by a belt passing over the pulley U on shaft W, and the pulleys V, X, and Y on their respective shaft and saw mandrels.

The saw, when in operation, is projected into an incision, $g$, formed in the cutting-table or frame L, over which the blank passes from the rolling or feed mill, thus severing, at one operation, a strip from the blank of a sufficient size to form a type. The saw is then thrown outward, for discontinuing its operation, through the medium of the arms $u\ v$, which are pivoted together, at their outer ends, by a fulcrum-bolt, $y$, and their inner ends connected, respectively, with an eccentric sleeve, $t$, on the revolving shaft W, and to the oscillating frame $w$.

Thus it will be perceived that the saw is alternately moved into a position for acting upon the type-blank to sever a requisite quantity of the same to form a type, when it recedes, and discontinues its operation until the blank has been advanced the proper distance or length of the type, when the saw is immediately thrown inward for repeating its cutting operation. The passage of the blank from the rolling-mill to the cutting and stamping device is through a passage or channel in the table-frame L, which channel, in order to receive blanks of various sizes, is formed by two lateral strips or bars, $e\ e$, and a base strip or bar $f$. By adjusting said bars, a variable channel can be made for guiding the movement of the blank and severed strips.

The grooves in the roller G conforming with the sizes of the blank to be rolled, and the feed-passage in the frame being susceptible of being enlarged or decreased in size, it will be evident that, by causing the groove used at the time to be in prolongation with the variable passage, the feed or movement of the blank will be continuous and steady. The rollers being mounted in the transverse or adjustable frame, the grooves in the same can be readily caused to conform with the feed-passage.

The severed type are caused to advance by the pressure in rear of the same, and are brought into a position for the proper action thereon of a reciprocating matrix-bar or die, N, which carries, on its inner end, the characters, letters, ornaments, &c., either in intaglio or relief, to be impressed upon the end of the type. Said matrix is actuated from the main shaft Q through the medium of an eccentric, S, and a connecting-rod, Q, which is applied to a projecting arm, $k$, moving in slotted guide-ways $j$, which are cast with the vertical standards $l$, constituting the receiving-frame of the matrix-bar. Various devices or matrices may be interchangeably used for manufacturing different kinds of type, and in order to enable the same to be readily applied and removed from the matrix-bar, I insert the same into dovetail grooves formed in the end face of the same. The matrix is brought into operation when the cutting-saw is in an operative position, and when the progressive movement of the series of cut type is for a moment arrested by the intermittently-acting pawl mechanism of the feed or rolling mill. The die or matrix being forced forward, the character upon the same is impressed upon the end of the type, the end of the same projecting just sufficiently from the end of the feed-passage to enable this operation to be performed without battering or laterally displacing the metal of the type. The adjustable strips $e\ e$, forming the variable feed-channel, are provided with chisel-shaped front ends, which, in connection with a similar cutting-lip, on a trip-hammer, M, form a rectangular inclosure, from which the head of the type projects when being acted upon by the matrix. The object of said cutting-edges is to remove from the pressure of the type any depression or abrasions produced by the action of the matrix.

When "kerned" letters are made the chisel-ends are shaped or filed so as to cut outside the kerned projection, sufficient metal being always depressed by the matrix to allow the minute "kern" to be formed by the chiseled guides.

Simultaneously with the action of the matrix for forming the letter or character on the type, there is brought into operation a trip-hammer or punch, M, for cutting the nicks in one side of the type. Said punch is provided with a recess or seat in its lower face for the reception of detachable cutters or punches, as seen in Fig. 3, and is actuated through the medium of a pivoted lever-arm, P, the fulcrum-shaft of which carries two heads, $m\ m$, which are caused to elevate the trip-hammer upon the depression of the lever P by a cam, $o$, upon the shaft W. The vertical movement of the trip-hammer is effected when the lever is so depressed by the engagement of the heads $m\ m$ with the projections $i\ i'$ on the hammer. The hammer has its fulcrum or is hinged at $h$, and will immediately descend by its own weight, for accomplishing the nicking operation, as soon as the cam $o$ has ceased its operation.

A machine constructed and operating as above described will enable types to be formed from blanks or strips of ductile metal with celerity and precision, the parallelism of the body being attained by the passage of the blank through the rolling-mill, after which it is successively subjected to the action of the cutting, stamping and nicking processes, for completing or finishing the type, before it is removed from the machine.

It will be apparent that when manufacturing quadrats, spaces, &c., not requiring any characters or letters, it will be necessary to discontinue the operation of the reciprocating matrix, which is effected by detaching it from the operative mechanism.

Having thus described my invention, what I claim as new, and desire to secure by Letters Patent, is—

1. In a machine for manufacturing types, &c., from blanks of ductile metals, the combination of a rolling-mill for compressing or shaping the blank, an intermittently-acting saw for cutting the blank into lengths for forming type, a reciprocating matrix or die for impressing the letter, character, &c., upon the same, and a trip-hammer or punch acting simultaneously with the latter for nicking the type, as herein shown and described.

2. The transversely-sliding frame A, rollers G H, ratchet and pawl mechanism I K, connecting-rod J, and eccentric T, constituting the mechanism for preparing and feeding the blank to the cutting, stamping, and nicking devices, as herein shown and described.

3. The intermittently-acting circular saw Z, oscillating frame w, arms u v, and eccentric t, combined with suitable mechanism for imparting a rotary motion to the saw, as and for the purpose described.

JULIUS SILVERSMITH.

Witnesses:
  E. C. VEASEY,
  GEO. S. EDDY.